US012743145B2

(12) United States Patent
Huott et al.

(10) Patent No.: US 12,743,145 B2
(45) Date of Patent: Sep. 22, 2026

(54) ENERGY EFFICIENCY USING A POWER SAVING CLOCK BUFFER FOR CLOCK GRID-BASED SCANNING

(71) Applicant: INTERNATIONAL BUSINESS MACHINES CORPORATION, Armonk, NY (US)

(72) Inventors: William V. Huott, Holmes, NY (US); Ann Chen Wu, Hopewell Junction, NY (US); Paul Alan Bunce, Poughkeepsie, NY (US); Leon Sigal, Monsey, NY (US)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 18/805,984

(22) Filed: Aug. 15, 2024

(65) Prior Publication Data

US 2026/0050318 A1 Feb. 19, 2026

(51) Int. Cl.
*G06F 1/3237* (2019.01)

(52) U.S. Cl.
CPC .................................. *G06F 1/3237* (2013.01)

(58) Field of Classification Search
CPC ..................................................... G06F 1/3237
See application file for complete search history.

(56) References Cited

U.S. PATENT DOCUMENTS 6,654,917 B1 * 11/2003 Floyd ............. G01R 31/318541 714/726
6,853,212 B2 2/2005 Chandar et al.
7,549,137 B2 6/2009 Alpert et al.
7,844,843 B2 11/2010 Freitas
8,104,014 B2 1/2012 Puri et al.
8,954,912 B2 2/2015 Alpert et al.
9,397,641 B2 7/2016 Hsu et al.
(Continued)

FOREIGN PATENT DOCUMENTS

WO 2020033064 A1 2/2020

OTHER PUBLICATIONS

Geng et al., "Design of flip-flops with clock-gating and pull-up control scheme for power-constrained and speed-insensitive applications," IET Computers & Digital Techniques, Research Article, IET Journal, vol. 10, Issue 4, https://doi.org/10.1049/iet-cdt.2015.0139, First Published: Jul. 1, 2016, 9 pages.
(Continued)

*Primary Examiner* — Nimesh G Patel
(74) *Attorney, Agent, or Firm* — Onyx IP Group

(57) ABSTRACT

A local clock buffer for improving energy efficiency using a power saving clock buffer for clock grid-based scanning includes a grid node that receives a global clock signal from a global clock grid; a clock enable latch configured to latch a clock enable signal, wherein the clock enable latch is clocked based on the global clock signal; a clock gate configured to output a functional clock signal in dependence upon a latched value of the clock enable signal; a scan clock enable latch configured to latch a scan enable signal, wherein the scan enable latch is a non-clocked latch; and a scan clock gate coupled to the output of the functional clock gate and configured to output a scan clock signal in dependence upon a latched value of the scan enable signal.

20 Claims, 6 Drawing Sheets

(56) References Cited

U.S. PATENT DOCUMENTS 9,762,213 B1* 9/2017 Huott .................. G06F 13/4243
10,162,914 B1 12/2018 Krishnamurthy et al.
10,205,454 B2 2/2019 Lapiana
10,333,500 B1 6/2019 Vickers et al.
10,650,112 B1 5/2020 Krishnamurthy
10,726,180 B1 7/2020 Chang et al.
10,784,864 B1 9/2020 Berzins et al.
10,878,152 B1 12/2020 Neves et al.
10,944,401 B1 3/2021 Kim
11,092,649 B2 8/2021 Berzins
2003/0208702 A1 11/2003 Smetana
2007/0101221 A1* 5/2007 Fredrickson ... G01R 31/318536 714/726
2007/0229134 A1 10/2007 Hamdan et al.
2008/0028357 A1 1/2008 Shimony
2009/0199038 A1* 8/2009 Sigal ......................... G06F 1/12 713/600
2011/0043260 A1 2/2011 Hart et al.
2011/0271128 A1* 11/2011 Cressman ............. G06F 1/3287 713/322
2013/0021072 A1 1/2013 Wang et al.
2013/0067292 A1* 3/2013 Tang .............. G01R 31/318594 714/E11.155
2013/0326451 A1 12/2013 Cho et al.
2014/0164860 A1* 6/2014 Kim ............... G01R 31/318536 714/731
2015/0084673 A1* 3/2015 Fleischer ............. H03K 19/096 326/95
2015/0168992 A1 6/2015 Choi
2016/0049937 A1 2/2016 Tong et al.
2018/0062658 A1 3/2018 Hsu et al.
2023/0208424 A1 6/2023 Baksh et al.
2023/0396250 A1 12/2023 Tsai et al.
2025/0271501 A1* 8/2025 Kawoosa ....... G01R 31/318536

OTHER PUBLICATIONS

Huott et al., Energy Efficiency Using a Power Saving Micro-Gating Clock Buffer, International Business Machines Corporation (IBM), U.S. Appl. No. 18/805,769, filed Aug. 15, 2024, 36 pages.

Kim et al., “Pulser Gating: A Clock Gating of Pulsed-Latch Circuits,” 16th Asia and South Pacific Design Automation Conference (ASP-DAC 2011), Yokohama, Japan, Date of Conference: Jan. 25-28, 2011, DOI: 10.1109/ASPDAC.2011.5722182, Date Added to IEEE Xplore: Mar. 3, 2011, 7 pages.

Ng et al., “Double Edge-Triggered Half-Static Clock-Gating D-Type Flip-Flop,” Solid State Electronics Letters, vol. 3, https://doi.org/10.1016/j.ssel.2021.08.001, Dec. 2021, 4 pages.

Appendix P; List of IBM Patent or Applications Treated as Related, Oct. 29, 2024, 2 pages.

Srinivasan et al., Power reduction by Clock Gating Technique, Elsevier, ScienceDirect, Smart Grid Technologies, Aug. 6-8, 2015, Procedia Technology, vol. 21, 2015, pp. 631-635, DOI: 10.1016/j.protcy.2015.10.075, Dec. 2015, 5 pages.

Vo et al., “Hybrid Data Driven Clock Gating and Data Gating Technique for Better Saving Power in ALU RISC-V,” International Journal of Electrical and Electronics Research (IJEER), vol. 12, Issue 1, Published Mar. 20, 2024, 9 pages.

Wagle et al., “A New Approach to Clock Skewing for Area and Power Optimization of ASICs Using Differential Flipflops and Local Clocking,” IEEE Transactions on Computer-Aided Design of Integrated Circuits and Systems , vol. 42, No. 1, DOI: 10.1109/TCAD.2023.3264798, Date of Publication: Apr. 5, 2023, 13 pages.

* cited by examiner

ENERGY EFFICIENCY USING A POWER SAVING CLOCK BUFFER FOR CLOCK GRID-BASED SCANNING

BACKGROUND

The present disclosure relates to methods, apparatus, and products for improving energy efficiency using a power saving clock buffer for clock grid-based scanning. In a synchronous digital system, a clock signal is used to define a time reference for the movement of data within the system. The clock distribution network, or clock grid, distributes the clock signal from a common point to all the elements that need the clock signal. Switching in clocked components consumes power, dissipates heat, and generates noise. Thus, it is inefficient or impossible to keep all clocked components connected to the clock grid all of the time. Rather, components are organized into clock domains that can be turned on and off. When elements of a particular clock domain are not being used, the clock supplied to that particular clock domain can be turned off to conserve power. This is referred to as clock gating.

SUMMARY

According to embodiments of the present disclosure, various methods and apparatuses for improving energy efficiency using a power saving clock buffer for clock grid-based scanning are described herein. Embodiments of the present disclosure provide a local clock buffer that requires only one clocked latch and one point of load on the clock grid to generate both the functional clock signal and the scan clock signal. This is achieved using a non-clocked latch for capturing the scan enable signal and deriving the scan clock signal from the functional clock signal path. Thus, the demand on the clock grid is reduced, which reduced the overall energy consumption of the microprocessor.

In some aspects, improving energy efficiency using a power saving clock buffer for clock grid-based scanning includes a local clock buffer including a grid node that receives a global clock signal from a global clock grid. The local clock buffer also includes a clock enable latch configured to latch a clock enable signal, where the clock enable latch is clocked based on the global clock signal. The local clock buffer also includes a clock gate configured to output a functional clock signal in dependence upon a latched value of the clock enable signal. The local clock buffer also includes a scan clock enable latch configured to latch a scan enable signal, wherein the scan clock enable latch is a non-clocked latch. The local clock buffer also includes a scan clock gate coupled to the output of the clock gate and configured to output a scan clock signal in dependence upon a latched value of the scan enable signal.

DETAILED DESCRIPTION

Figure 1A:
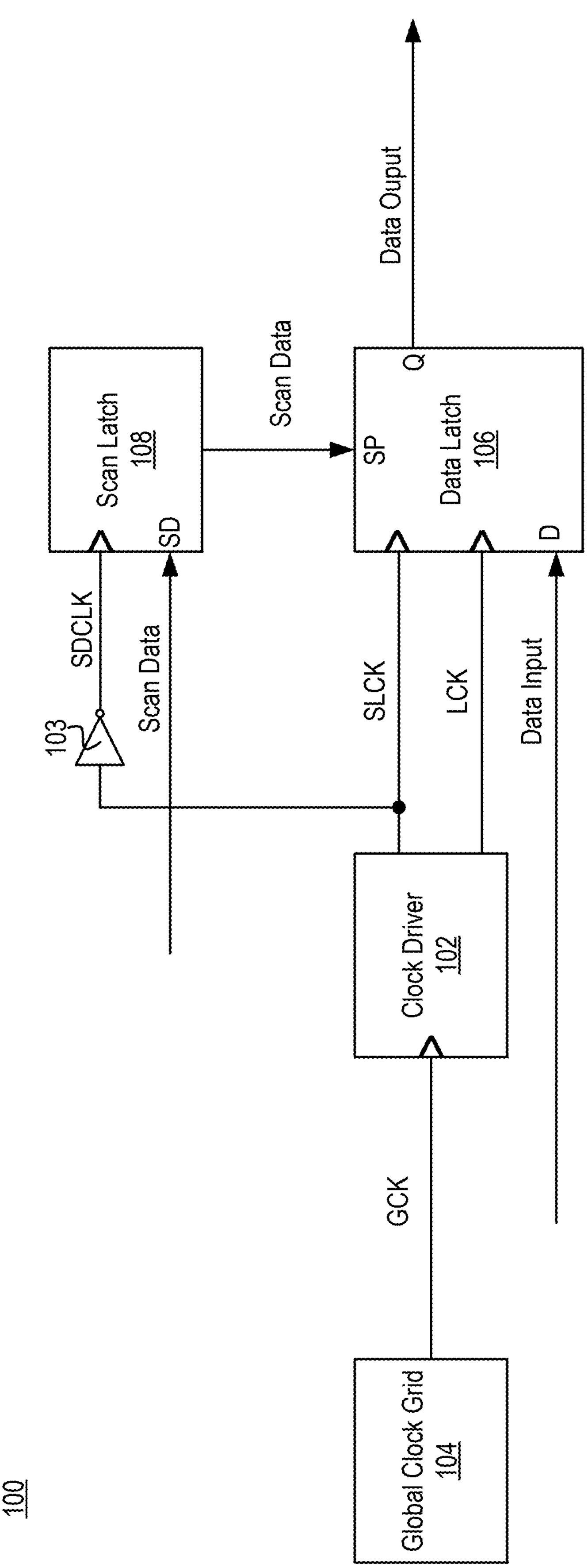
FIG. 1A sets forth an environment for improving energy efficiency using a power saving clock buffer for clock grid-based scanning in accordance with at least one embodiment of the present disclosure.

Synchronous digital systems are described in the context of signals, gates, and logic. As used herein, the terms “high,” “active,” and “logic one” are used interchangeably to refer to a signal or value that is asserted, where an asserted signal meets, for example, a certain voltage threshold. The terms “low,” “inactive,” and “logic zero” are used interchangeably to refer to a signal or value that is not asserted. Logic-level descriptions of digital systems are discussed below. It will be appreciated that implementations of logic-level designs, including transistor-level implementations, may vary without departing from the spirit of the present disclosure.

In a synchronous digital system, a clock signal is used to define a time reference for the movement of data within the system. The clock distribution network, or clock grid, distributes the clock signal from a common point to all the elements that need the clock signal. Constructing a clock network for microprocessors is becoming increasingly difficult with new process technologies and as circuit complexity increases. In particular, power dissipation has become a limiting factor for the yield of low power, high-performance circuit designs. Clock networks can contribute a large share of the total active power in multi-GHz designs. Low power designs are preferable since they exhibit less power supply noise and provide better tolerance with regard to manufacturing variations.

There are several techniques for minimizing power while still achieving timing objectives for high performance, low power systems. One technique uses local clock buffers (LCBs) to distribute the clock signals. A typical clock control system has a clock generation circuit that generates a global clock signal which is fed to a clock distribution network that renders synchronized global clock signals at the LCBs. Each LCB adjusts the global clock duty cycle and edges to meet the requirements of respective circuit elements, e.g., local logic circuits or latches. In some techniques, LCBs use the global clock signal to provide a local clock signal and a scan clock signal to data latches. During a scan operation, scan data is moved into data latches for the purpose of testing, diagnostics, and other purposes outside of the functional data path. The data latches uses the scan clock instead of the functional local clock signal in carrying out the scan operation. The functional local clock signal and the scan clock are separately enabled and disabled. Typically, one latch is used to latch the local clock enable and another latch is used to latch the scan clock enable. Thus, in such implementations, an LCB includes at least two clocked devices that are clocked by the global clock grid. Further, the scan clock is typically connected to the clock grid node, thus adding an additional load on the clock grid.

With technology scaling, the number of latches is growing exponentially and the number of LCBs along with them. LCB power in connecting to the high-speed global clock distribution does not scale with technology due to metal capacitance. Therefore, it is advantageous to reduce global clock grid power by minimizing the number of clocked devices in the microprocessor.

To minimize the number latches in an LCB and the number of grid connected devices, embodiments in accordance with the present disclosure reduce clock grid power demand the 'always-on' power demand of the local clock buffers by eliminating any devices needed for scan clocks from switching with the grid when not scanning. In embodiments, power demand is reduced by eliminating the clocked L1 latch for the scan enable signal and replacing it with a non-clocked latch, such as a set-reset latch, as well as by deriving the scan clock signal through the functional clock path of the clock buffer, instead of a separate grid connected gate for the scan clock paths.

FIG. 1A sets forth an example scannable latch environment 100 suitable for high performance data latching using an energy efficient clocked latch topology in accordance with aspects of the present disclosure. The environment includes a local clock buffer 102 that receives a global clock signal GCK from a global clock grid 104. In some examples, the local clock buffer 102 provides a functional clock signal LCK and a scan clock signal SCK to at least one data latch 106. However, it will be appreciated that the functional clock signal LCK and the scan clock signal SCK can be provided by separate clock drivers. As part of the functional data path, input data is provided to a data input port D of the data latch 106, which latches the value at input D on the rising edge of the functional clock signal LCK. The latch data is stored and output by the latch on a data output port Q until the latched value is changed by a new data value.

In the example of FIG. 1A, data latch 106 is a scannable latch that is coupled to a scan latch 108 that controls the input of scan data into the data latch. In such an arrangement, data latch 106 is a subordinate L2 latch and scan latch 108 is an L1 latch. The scan latch 108 is configured to receive scan data SD at a scan-in data input of scan latch 108. The scan clock signal SCK is inverted by inverter 103 and provided as a scan data clock signal SDCK to the clock input of scan latch 108. During a scan operation, scan data is launched on scan latch 108, which latches the scan data on the rising edge of the scan data clock signal SDCK. The latched scan data is output via a scan-out data output SO to a scan port SP of the data latch 106. During the scan mode of operation, the scan port of the data latch controls the latch circuitry to latch scan data from the scan port on the rising edge of the scan clock signal SCK and output via the output port of data latch 106. The scan port circuitry is not clocked by the functional clock signal LCK and is only used during a scan operation, and thus it is noted that the scan port circuitry is not part of the functional data path within data latch 106.

Figure 1B:
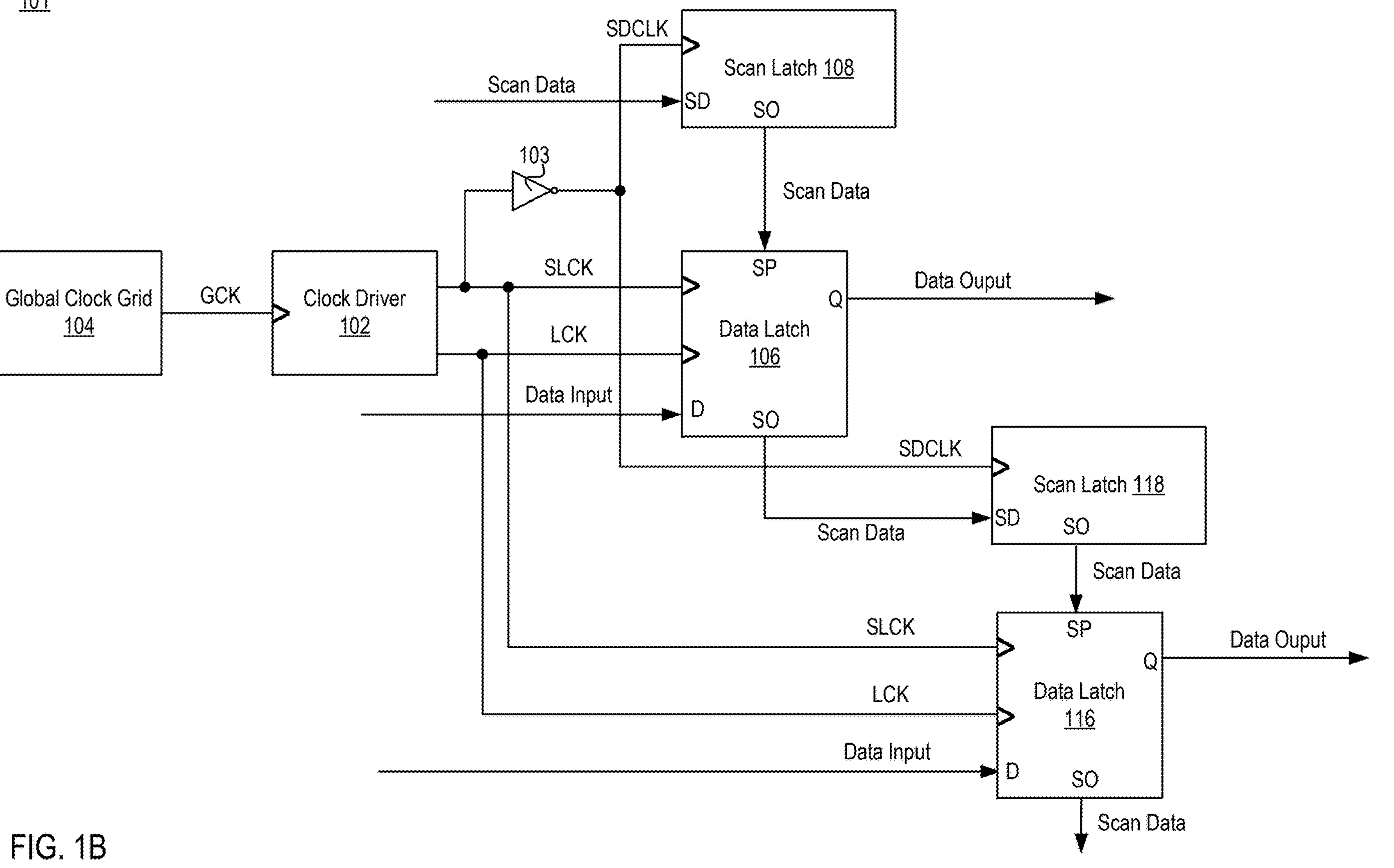
FIG. 1B sets forth an environment for improving energy efficiency using a power saving clock buffer for clock grid-based scanning in accordance with at least one embodiment of the present disclosure.

For further explanation, FIG. 1B sets forth another example of a scannable latch environment 101 suitable for implementing a low power topology in a clocked latch in accordance with aspects of the present disclosure. To test the interoperability of latches, data latches and scan latches can be daisy chained, where a scan latch receives scan data from a scan out port of a preceding data latch in the chain. The example of FIG. 1B is similar to the example of FIG. 1A but further includes an additional data latch 116 that receives a data input D and also receives the functional clock signal LCK and the scan clock signal SCK from local clock buffer 102. An additional scan latch 118 receives the scan data from a scan-out data output SO of data latch 106 and passes the scan data into the scan port of data latch 116. In this way, the scan circuitry can scan data into a string of latches to test the interoperability of the latches. It will be appreciated that more than two scan latches and data latches can be strung together.

Figure 2:
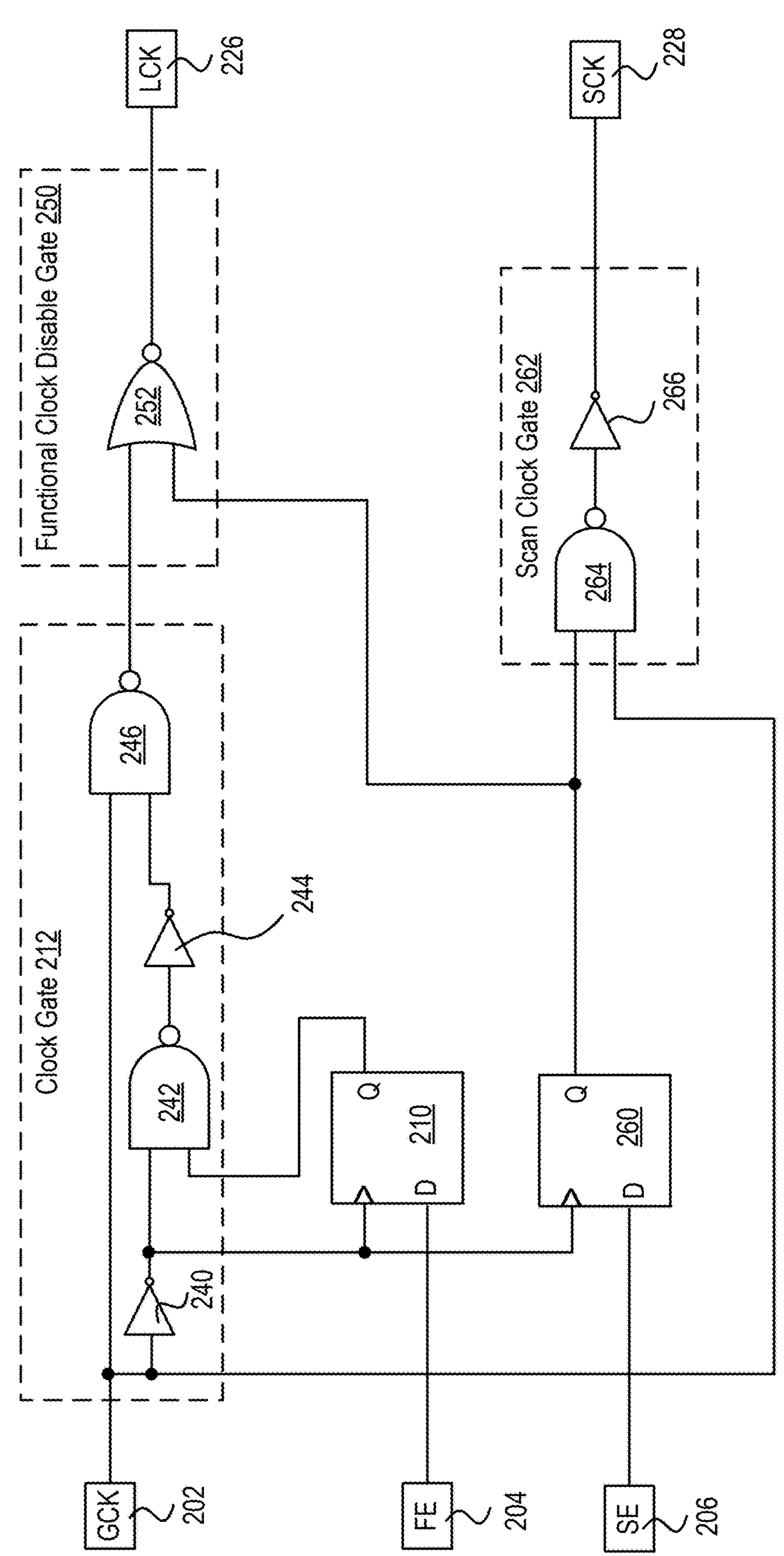
FIG. 2 sets forth an example local clock buffer.

For further explanation, FIG. 2 sets forth an example local clock buffer 200 that uses separate clocked latches for local clock enable and scan clock enable. The example local clock buffer 200 of FIG. 2 includes a grid node 202 that receives a global clock signal GCK from the clock grid (e.g., global clock grid 104 in FIG. 1A). The example local clock buffer 200 also includes a clock enable input node 204 that receives clock enable signal FE (also referred to herein as a 'functional clock enable') for enabling and disabling a clock signal generated by the local clock buffer 200. The example local clock buffer 200 also includes a scan enable input node 206 that receives scan clock enable signal SE (also referred to herein as a 'scan enable') for enabling and disabling a scan clock signal generated by the local clock buffer 200.

In the functional clock path, the example local clock buffer 200 includes a clock enable capture latch 210 that is a clocked latch for storing a value of the functional clock enable signal FE. Thus, the clock enable capture latch 210 includes a clock input and an enable signal input. The clock input receives a signal from inverter 240 that inverts the global clock signal GCK from grid node 202. The enable input receives an enable signal from the clock enable input node 204. The capture latch 210 latches and outputs the value of the enable input on the falling edge the global clock signal. That is, the capture latch 210 latches a logic one on the falling edge of GCK when the functional clock enable signal FE is active.

In the functional clock path, the example local clock buffer 200 further includes a clock gate 212. In this example, clock gate 212 is implemented as a 'clock chopper' that generates a chopped clock signal from the global clock signal. Generally, in a clock chopper, a chopped clock signal output by the clock chopper goes high in response to a global clock signal going high; however, the chopped clock signal has a shorter pulse than the global clock, and thus goes low before the global clock goes low. This chopped clock signal is also referred to as a pulsed clock signal. Thus, the shorter pulse-width of the pulsed clock signal reduces the risk that a value in an upstream latch that changed during an active clock phase will be prematurely propagated to the downstream latch. An example implementation of a clock chopper is shown in FIG. 2; however, it will be appreciated that other logic may be used to implement a chopped clock signal.

The example clock chopper implementation of the clock gate 212 includes a first NAND 242 that receives the inverted global clock signal GCK from the inverter 240 as a first input and the enable value stored in the clock enable capture latch 210 as a second input. The output of the first NAND 242 is inverted by a second inverter 244 and propagated to a first input of a second NAND 246. Accordingly, a slow signal path through the first inverter 240, the first NAND 242, and the second inverter 244 acts to delay the value of GCK to the first input of the second NAND 246. This slow signal path is gated by the clock enable signal CE. The NAND 246 also receives the global clock signal GCK at a second input. Thus, when the global clock signal GCK transitions to active, the second NAND 246 evaluates the value of GCK in the current clock phase and the inverted value of GCK in the previous clock phase for a period of three gate delays. In other words, the second NAND 246 evaluates a logic one at the GCK input and a logic one at the slow signal path input until the logic zero being propagated through the signal path catches up the second NAND 246. Accordingly, the output of the clock gate 212 is a chopped clock signal having pulse width that is equal to approximately three gate delays. The pulse width of the chopped clock signal, and thus the functional local clock signal, can be controlled by the number of delays inserted in the slow signal path to NAND 246.

The functional clock path also includes a functional clock output gate 250 that is, in this example, implemented by NOR gate 252. The functional clock disable signal operates to disable the functional clock output during a scan operation, as will be explained in more detail below, and otherwise outputs the functional clock signal. The NOR gate 252 receives the chopped clock signal from clock gate 212 at a first input and a functional clock disable signal at a second input. When the functional clock is not disabled by NOR gate 252, the chopped clock signal is inverted and output as a pulsed functional clock signal, i.e., local clock signal LCK, to the functional clock signal output node 226. The pulsed functional clock signal is used as a local clock signal for a particular clock domain.

In the scan clock path, the example local clock buffer 200 includes a scan enable capture latch 260 that is a clocked latch for storing a value of the scan enable signal SE. Thus, the scan enable capture latch 260 includes a clock input and an enable signal input. The clock input receives a signal from inverter 240 that inverts the global clock signal GCK from grid node 202. The enable input receives an enable signal from the scan enable input node 206. The scan enable capture latch 260 latches and outputs the value of the scan enable input on the falling edge the global clock signal. That is, the scan enable capture latch 260 latches a logic one on the falling edge of GCK when the scan enable signal SE is active.

In the scan clock path, the example local clock buffer 200 further includes a scan clock gate 262 that outputs a scan clock signal based on the global clock signal GCK in accordance with the value of the scan enable signal SE. In this example, the scan clock gate 262 includes a NAND gate 264 that receives the latched scan enable signal output by scan enable capture latch 260 as a first input and the global clock signal as a second input. The scan clock gate 262 also includes an inverter 266 that inverts the output of NAND gate 264. The signal output by inverter 266 provides the scan clock signal SCK to the scan clock output node 228. The latched scan enable signal output by scan enable capture latch 260 is also provided as a second input to NOR gate 252 in the functional clock output gate 250. Thus, when the scan enable signal is logic one, the functional clock output gate 250 does not output a functional clock signal. Accordingly, output of the functional clock signal is disabled during the scan operation.

It should be appreciated that the local clock buffer requires two clocked latches, one for the functional clock path (i.e., clock enable capture latch 210) and one for the scan clock path (i.e., scan enable capture latch 260). Each of these clocked latches is 'always on' in that they are driven by the global clock signal and thus require always-on power. Further, there are two clock gates that gate the global clock signal, and thus additional devices that are driven by the global clock signal. Given the large number of local clock buffers in a microprocessor, these latches and gates significantly contribute to the power consumption of the microprocessor. As such, any improvement to the energy efficiency of the local clock buffer is greatly advantageous.

Figure 3:
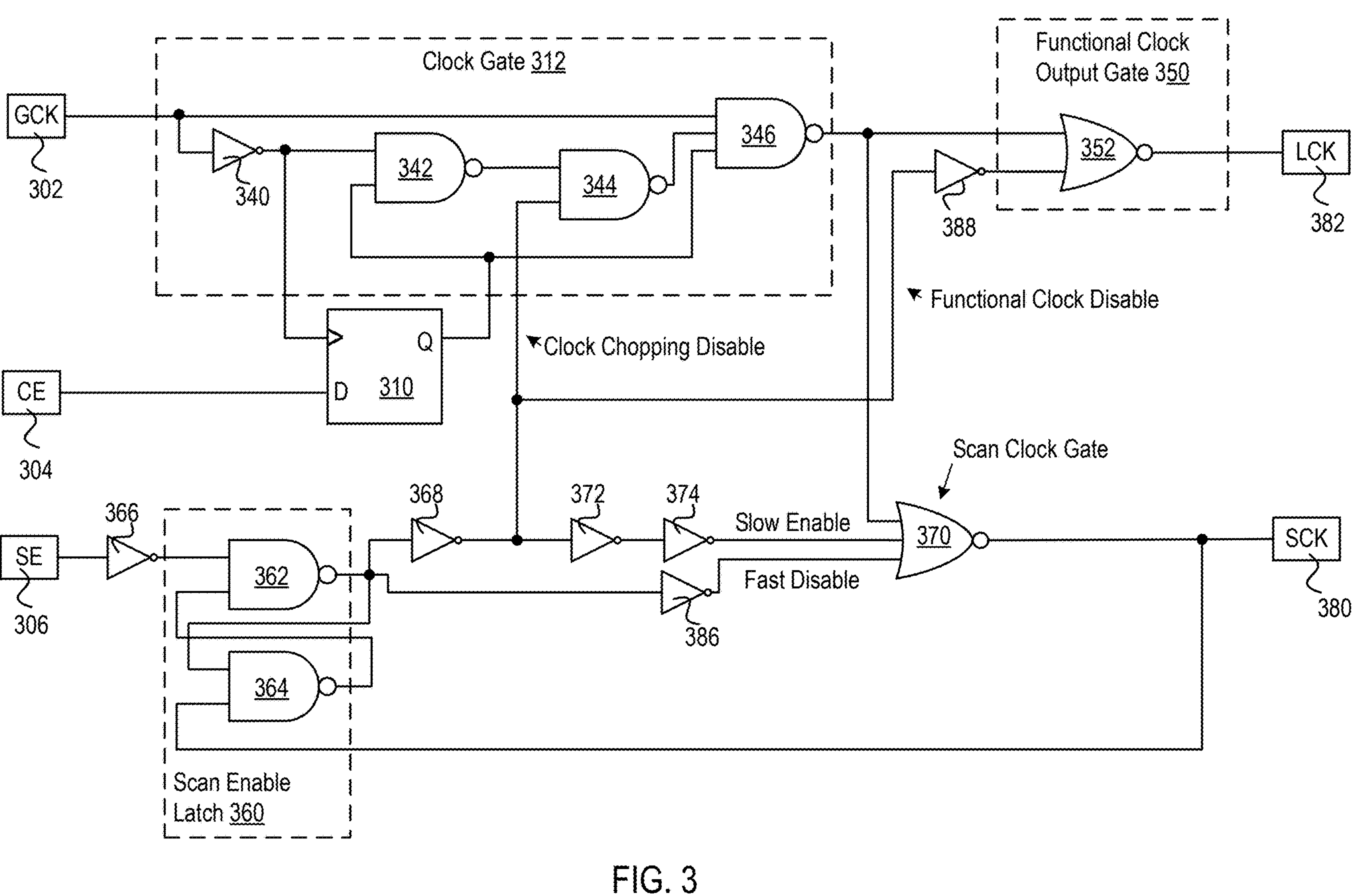
FIG. 3 sets forth an example local clock buffer for improving energy efficiency using a power saving clock buffer for clock grid-based scanning in accordance with at least one embodiment of the present disclosure.

To address this, FIG. 3 illustrates a local clock buffer for improving energy efficiency using a power saving clock buffer for clock grid-based scanning in accordance with at least one embodiment of the present disclosure. The local clock buffer 300 reduces clock grid power and loading, as well as the always-on power of the local clock buffer, by excluding any devices needed for the scan clock from switching with the grid when not scanning. This is carried out by eliminating the clocked latch for the scan enable signal and replacing it with a non-clocked latch, such as a set-reset latch, as well as by deriving the scan clock through the functional clock path in the clock buffer instead of a separate grid-connected gate for the scan clock path.

The example local clock buffer 300 of FIG. 3 includes a grid node 302 that receives a global clock signal GCK from the clock grid (e.g., global clock grid 104 in FIG. 1A). The example local clock buffer 300 also includes a clock enable input node 304 that receives clock enable signal CE (also referred to herein as a 'clock enable') for enabling and disabling clock signals generated by the local clock buffer 300. The example local clock buffer 300 also includes a scan enable input node 306 that receives scan clock enable signal SE (also referred to herein as a 'scan enable') for enabling and disabling a scan clock signal generated by the local clock buffer 300. The local clock buffer generates and outputs a functional clock signal LCK at functional clock signal output node 382 and a scan clock signal SCK at a scan clock signal output node 380.

In the functional clock path, the example local clock buffer 300 includes a clock enable capture latch 310 that is a clocked latch for storing a value of the clock enable signal CE. Thus, the clock enable capture latch 310 includes a clock input and an enable signal input. The clock input receives a signal from inverter 340 that inverts the global clock signal GCK from grid node 302. The enable input receives an enable signal from the clock enable input node 304. The capture latch 310 latches and outputs the value of the enable input on the falling edge the global clock signal. That is, the single capture latch 310 latches a logic one on the falling edge of GCK when the clock enable signal CE is active.

In the functional clock path, the example local clock buffer 300 further includes a clock gate 312. In this example, clock gate 312 is implemented as a 'clock chopper' that generates a chopped clock signal from the global clock signal. Generally, in a clock chopper, a chopped clock signal output by the clock chopper goes high in response to a global clock signal going high; however, the chopped clock signal has a shorter pulse than the global clock, and thus goes low before the global clock goes low. This chopped clock signal is also referred to as a pulsed clock signal. Thus, the shorter pulse-width of the pulsed clock signal reduces the risk that a value in an upstream latch that changed during the active phase of the global clock will be prematurely propagated to the downstream latch. An example implementation of a clock chopper is shown in FIG. 3; however, it will be appreciated that other logic may be used to implement a chopped clock signal.

The example clock chopper implementation of the clock gate 312 includes a first NAND 342 that receives the inverted global clock signal GCK from the inverter 340 as a first input and the enable value stored in the clock enable capture latch 310 as a second input. The output of the first NAND 342 is propagated as a first input to a second NAND gate 344. The second NAND gate 344 also receives the value of the scan enable signal as a second input, as will be explained in more detail below. Thus, when the scan enable signal is a logic one, NAND gate 344 also evaluates to logic one and thus effectively turns off the 'clock chopping' aspect of clock gate 312 (thus NAND gate 344 functions as a clock chopping disable gate). The output of the second NAND gate 344 is propagated to a third NAND gate 346 that also receives the global clock signal GCK at a first input, the output of NAND gate 344 at a second input, and the latched clock enable signal at a third input. Accordingly, a slow signal path through the first inverter 340, the first NAND 342, and the second NAND gate 344 acts to delay the value of GCK to the second input of the third NAND gate 346. This slow signal path is gated by the output of the functional scan enable latch 360. Thus, when the global clock signal GCK transitions to active, the third NAND gate 346 evaluates the value of GCK in the current clock phase and the inverted value of GCK from the previous clock phase for a period of three gate delays. In other words, the third NAND gate 346 evaluates a logic one at the GCK input and a logic one at the slow signal path input until the logic zero being propagated through the signal path catches up the third NAND gate 346. Accordingly, the output of the clock gate 312 is a chopped clock signal having pulse width that is equal to approximately three gate delays. The pulse width of the chopped clock signal, and thus the functional local clock signal, can be controlled by the number of delays inserted in the slow signal path to NAND gate 346. However, when the scan enable signal SE is asserted, the output of the second NAND gate 344 is forced to logic 1, and the output of clock gate 312 reflects the global clock signal without clock chopping. When the clock gate 312 is not enabled and thus clock enable CE is logic zero, NAND gate 346 will not switch states and is effectively turned off, thereby turning off clock signal generation (both functional and scan) in the local clock buffer.

The functional clock path also includes a functional clock output gate 350 that is, in this example, implemented by NOR gate 352. A functional clock disable signal operates to disable the functional clock output during a scan operation, as will be explained in more detail below. The NOR gate 352 receives the chopped clock signal from clock gate 312 at a first input and a functional clock disable signal at a second input. When the functional clock signal output is not disabled by NOR gate 352, the chopped clock signal is inverted and output as the pulsed functional clock signal at functional clock output node 382. The pulsed functional clock signal is used as a local clock signal for a particular clock domain.

In the scan clock path, the example local clock buffer 300 includes a scan enable capture latch 360 that is a non-clocked latch for storing a value of the scan enable signal SE. In this example, the scan capture latch 360 is a set-reset latch including and implemented by cross-coupled NAND gates 362, 364. However, it will be appreciated that other types and implementations of a non-clocked latch can be used. The scan enable signal is inverted by inverter 366 and propagated as a first input to NAND gate 362 (set input). The second input to NAND gate 362 is received from the output of NAND gate 364. NAND gate 364 receives the output of NAND gate 362 at a first input and the scan clock signal output by a scan clock gate 370 as a second input (reset input). The scan enable capture latch 360 controls the scan clock gate 370 via a slow scan enable path and a fast scan disable path. The scan clock gate 370 receives the clock signal from clock gate 312 (with clock chopping disabled) and the scan enable signal SE from the slow scan enable path and the fast scan disable path. The slow scan enable path ensures that the scan clock signal output is not enabled until clock chopping is disabled, and the fast scan disable path ensures that the scan clock is disabled quickly before the clock chopping in the functional clock path is re-enabled, as will be described in more detail below.

Along the slow path for scan enable, the latched scan enable that is output from scan enable capture latch 360 is inverted by inverter 368. This signal is provided as a second input to NAND gate 344 as discussed above as a clock chopping disable signal. Thus, when scan enable SE is high, NAND gate 344 receives a logic zero (the inverted scan enable value) and the clock chopping function of clock gate 312 is turned off (i.e., NAND gate 344 is prevented from switching). Thus, clock gate 312 outputs a non-chopped clock signal that follows the global clock signal GCK. Accordingly, scan clock gate 370 receives a clock signal via clock gate 312 operating in the non-clock chopping mode and output a scan clock signal to scan clock output node 380. However, the slow scan signal path also includes two additional inverters 372, 374. The gate delay introduced by these inverters 372, 374 offsets the gate delay of NAND gate 344 and ensures that the clock chopping feature of clock gate 312 is disabled before the scan clock gate 370 is switched on, such that the scan clock generated from the global clock signal and not a pulsed/chopped clock signal. When scan enable SE is reset to low, NAND gate 344 is turned on and the clock chopping aspect of clock gate 312 resumes.

Also along the slow path for scan enable, the output of inverter 368 (the inverted output of scan enable capture latch 360) is inverted by inverter 388 and provided to the functional clock output gate 350. Thus, when scan enable SE is high, the functional clock disable signal is high and NOR gate 352 is turned off to prevent a clock signal output at the functional clock output node 382. Thus, the output of the functional clock signal is disabled during the scan operation. When scan enable SE is low, the functional clock disable signal is low and NOR gate 352 switches in accordance with the clock signal from clock gate 312.

Along the fast path for scan disable, the latched scan enable that is output from scan enable capture latch 360 is inverted by inverter 386. No additional delays are introduced between inverter 386 and scan clock gate 370. Thus, the scan clock gate is turned off (i.e., the scan clock signal is turned off) before the clock chopping aspect of clock gate 312 is resumed. That is, when the scan enable is reset to logic zero, clock chopping is reenabled by the clock chopping disable signal input to NAND gate 344 and functional clock output is reenabled by the functional clock disable signal input to NOR gate 352. However, the scan clock gate 370 is disabled through the fast path for scan disable before the chopped functional clock signal is output due to intrinsic gate delay in the functional clock path.

In view of the foregoing, it will be appreciated that the scan clock signal is derived from the output of the clock gate 312 in the functional clock path instead being driven by the clock grid node, thus reducing the demand on the clock grid. The clock enable CE must be high to enable clock gate 312 so that, when scan enable SE is high, the output of clock gate 312 can be used to generate the scan clock signal.

Figure 4:
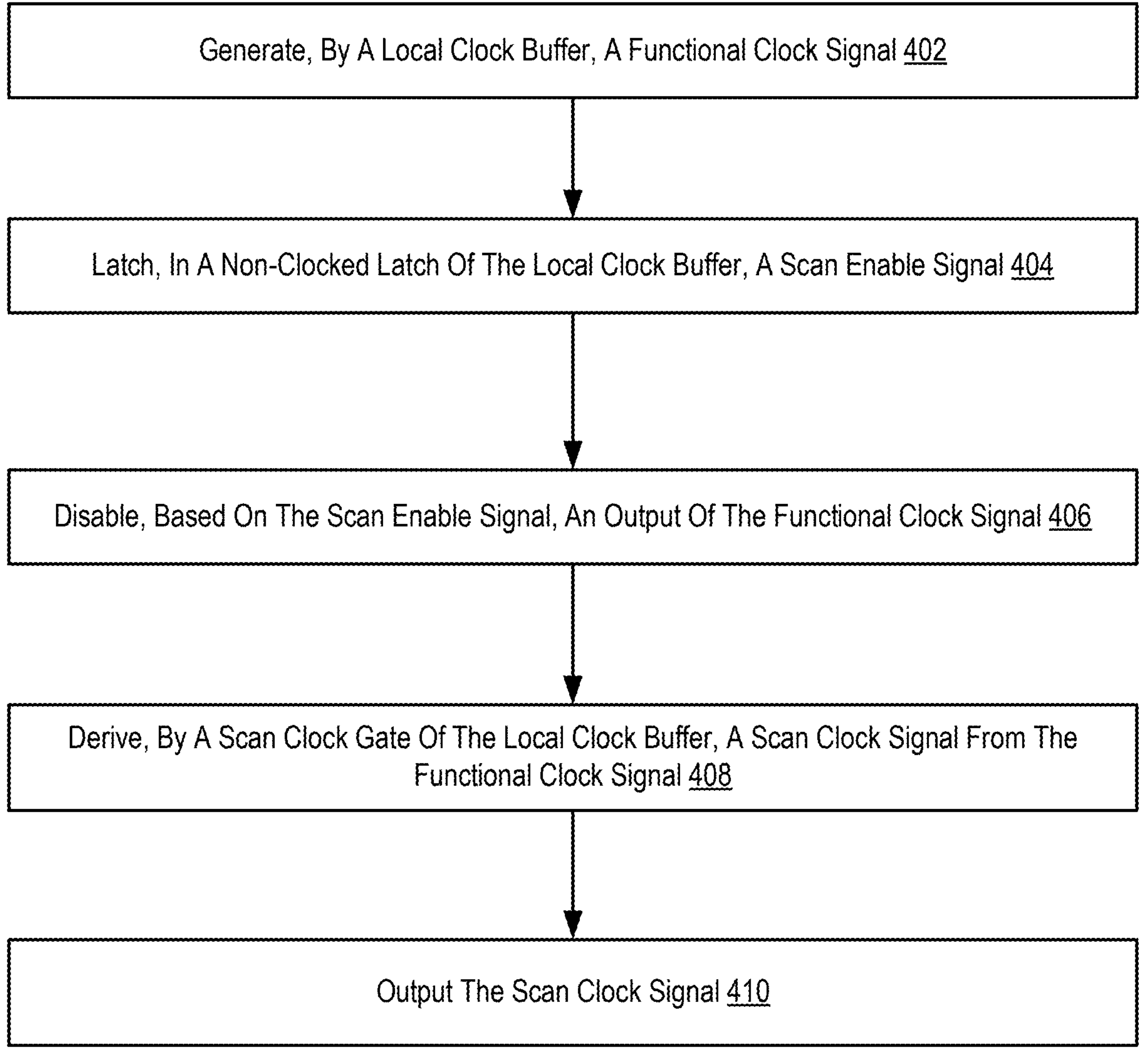
FIG. 4 sets forth a flow chart for an example method of improving energy efficiency using a power saving clock buffer for clock grid-based scanning in accordance with at least one embodiment of the present disclosure.

For further explanation, FIG. 4 sets forth a flow chart of an example method for improving energy efficiency using a power saving clock buffer for clock grid-based scanning in accordance with at least one embodiment of the present disclosure. The method of FIG. 4 includes generating 402, by a local clock buffer, a functional clock signal. As discussed above, when a clock enable signal is received by the local clock buffer, the enable signal is latched in a clocked latch, the output of which is used by a clock gate to generate the functional clock signal (i.e., a local clock signal). The functional clock signal is output by a functional clock output gate.

The method of FIG. 4 also includes latching 404, in a non-clocked latch of the local clock buffer, a scan enable signal. In some examples, as discussed above, the local clock buffer latches 404 the scan clock enable signal in a set-reset latch or other non-clocked latch. Because a non-clocked latch is used, the demand on the global clock grid is reduced.

The method of FIG. 4 also includes disabling 406, based on the scan enable signal, an output of the functional clock signal. In some examples, as discussed above, the scan enable output of the non-clocked latch is used to disable the functional clock output gate 350, thus turning off the functional clock signal for any attached latches.

The method of FIG. 4 also includes deriving 408, by a scan clock gate, a scan clock signal from the functional clock signal. In some examples, as discussed above, the local clock buffer derives 408 the scan clock signal from the functional clock path by using the functional clock signal as an input to the scan clock gate that generates the scan clock signal. Thus, only one clock grid load point is needed to drive both the functional clock signal and the scan clock signal.

The method of FIG. 4 also includes outputting 410 the scan clock signal. With the functional clock signal output disabled, the scan clock is output to attached latches to use during scan operations.

In view of the foregoing, it will be appreciated that embodiments of the present disclosure provide a local clock buffer that requires only one clocked latch and one point of load on the clock grid to generate both the functional clock signal and the scan clock signal. This is achieved using a non-clocked latch for capturing the scan enable signal and deriving the scan clock from the functional clock. Thus, the demand on the clock grid is reduced, which reduced the overall energy consumption of the microprocessor.

Figure 5:
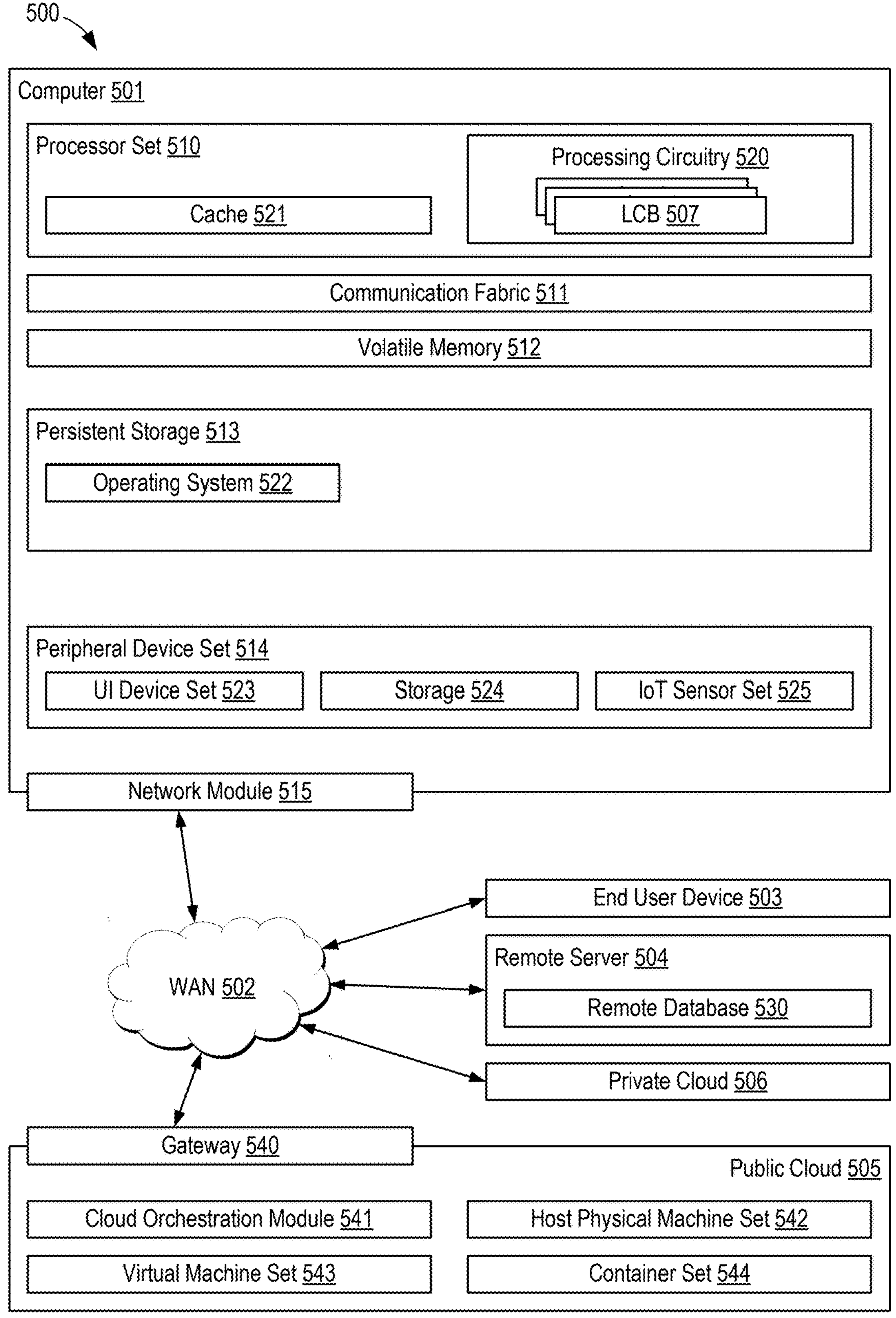
FIG. 5 sets forth an example computing environment according to aspects of the present disclosure.

FIG. 5 sets forth an example computing environment according to aspects of the present disclosure. Computing environment 500 contains an example of an environment for the execution of computer code. Computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

Computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

Processor set 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing. Processing circuitry 520 includes at least one local clock buffer 507 for improving energy efficiency using a power saving clock buffer for clock grid-based scanning in accordance with embodiments of the preset disclosure described above, such as the local clock buffer of FIG. 3.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 521 and the other storage media discussed below. The program instructions, and associated data, are accessed by processor set 510 to control and direct performance of the computer-implemented methods. In computing environment 500, at least some of the instructions for performing the computer-implemented methods may be stored in persistent storage 513.

Communication fabric 511 is the signal conduction path that allows the various components of computer 501 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

Persistent storage 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel.

Peripheral device set 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database), this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

Network module 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the computer-implemented methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

Remote server 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

Public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A local clock buffer comprising:

a grid node that receives a global clock signal from a global clock grid;

a clock enable latch configured to latch a clock enable signal, wherein the clock enable latch is clocked based on the global clock signal;

a clock gate configured to output a functional clock signal in dependence upon a latched value of the clock enable signal;

a scan clock enable latch configured to latch a scan enable signal, wherein the scan clock enable latch is a non-clocked latch; and a scan clock gate coupled to an output of the clock gate and configured to output a scan clock signal in dependence upon a latched value of the scan enable signal.

2. The local clock buffer of claim 1, wherein the clock gate is configured to output a pulsed clock signal when clock chopping is enabled for the clock gate; and wherein clock chopping is disabled by enabling the scan clock signal.

3. The local clock buffer of claim 1 further comprising a functional clock output gate configured to gate the output of the functional clock signal by the local clock buffer; and wherein output of the functional clock signal by the local clock buffer is disabled by enabling the scan clock signal.

4. The local clock buffer of claim 1, wherein the scan clock gate is coupled to a slow input path for enabling the scan clock signal and a fast input path for disabling the scan clock signal, wherein both the slow input path and the fast input path propagate the latched value of the scan enable signal to the scan clock gate.

5. The local clock buffer of claim 4, wherein a clock chopping disable gate and a functional clock output gate receive an input based on the scan enable signal.

6. The local clock buffer of claim 1, wherein the scan clock enable latch is a set-reset latch.

7. The local clock buffer of claim 6, wherein a set input of the set-reset latch receives the scan enable signal and wherein a reset input of the set-reset latch receives the output of the scan clock gate.

8. A processor comprising:

one or more data latches configured for functional data latching and scan data latching; and a local clock buffer configured to provide a functional clock signal and a scan clock signal to the one or more data latches, the local clock buffer comprising:

a grid node that receives a global clock signal from a global clock grid;

a clock enable latch configured to latch a clock enable signal, wherein the clock enable latch is clocked based on the global clock signal;

a clock gate configured to output the functional clock signal in dependence upon a latched value of the clock enable signal;

a scan clock enable latch configured to latch a scan enable signal, wherein the scan clock enable latch is a non-clocked latch; and a scan clock gate coupled to an output of the clock gate and configured to output the scan clock signal in dependence upon a latched value of the scan enable signal.

9. The processor of claim 8, wherein the clock gate is configured to output a pulsed clock signal when clock chopping is enabled for the clock gate; and wherein clock chopping is disabled by enabling the scan clock signal.

10. The processor of claim 8 further comprising a functional clock output gate configured to gate the output of the functional clock signal by the local clock buffer; and wherein output of the functional clock signal by the local clock buffer is disabled by enabling the scan clock signal.

11. The processor of claim 8, wherein the scan clock gate is coupled to a slow input path for enabling the scan clock signal and a fast input path for disabling the scan clock signal, wherein both the slow input path and the fast input path propagate the latched value of the scan enable signal to the scan clock gate.

12. The processor of claim 11, wherein a clock chopping disable gate and a functional clock output gate receive an input based on the scan enable signal.

13. The processor of claim 8, wherein the scan clock enable latch is a set-reset latch.

14. The processor of claim 13, wherein a set input of the set-reset latch receives the scan enable signal and wherein a reset input of the set-reset latch receives the output of the scan clock gate.

15. A method of improving energy efficiency using a power saving clock buffer for clock grid-based scanning, the method comprising:

generating, by a local clock buffer, a functional clock signal;

latching, in a non-clocked latch of the local clock buffer, a scan enable signal;

disabling, based on the scan enable signal, an output of the functional clock signal;

deriving, by a scan clock gate of the local clock buffer, a scan clock signal from the functional clock signal; and outputting the scan clock signal.

16. The method of claim 15, wherein a functional clock gate is configured to output a pulsed clock signal as the functional clock signal when clock chopping is enabled for the functional clock gate; and wherein clock chopping is disabled by enabling the scan clock signal.

17. The method of claim 15, wherein the scan clock gate is coupled to a slow input path for enabling the scan clock signal and a fast input path for disabling the scan clock signal, wherein both the slow input path and the fast input path propagate a latched value of the scan enable signal to the scan clock gate.

18. The method of claim 17, wherein a clock chopping disable gate and a functional clock output gate receive an input based on the scan enable signal.

19. The method of claim 15, wherein the non-clocked latch is a scan clock enable latch that is a set-reset latch.

20. The method of claim 19, wherein a set input of the set-reset latch receives the scan enable signal and wherein a reset input of the set-reset latch receives the output of the scan clock gate.

* * * * *